(No Model.)
J. P. DEUBEL.
MIDDLINGS PURIFIER.
No. 352,810. Patented Nov. 16, 1886.
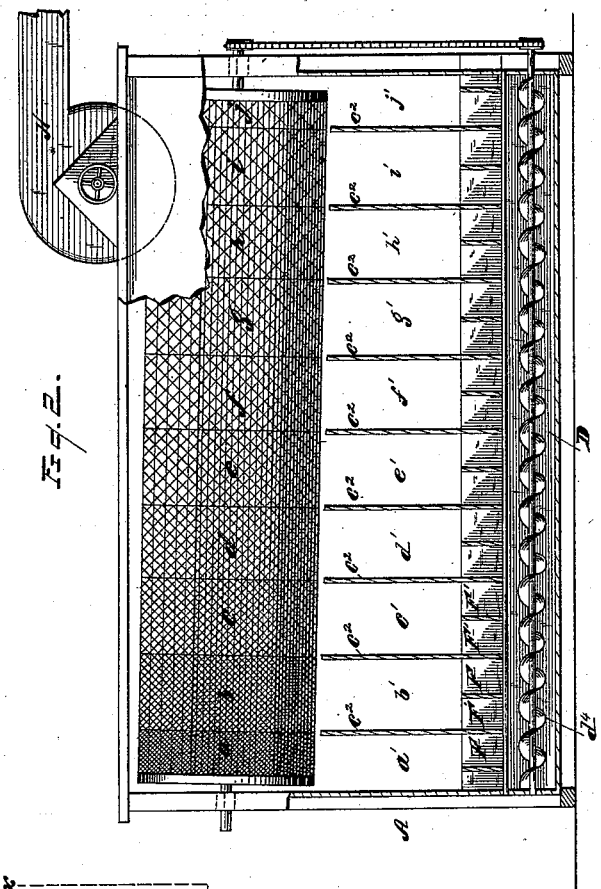
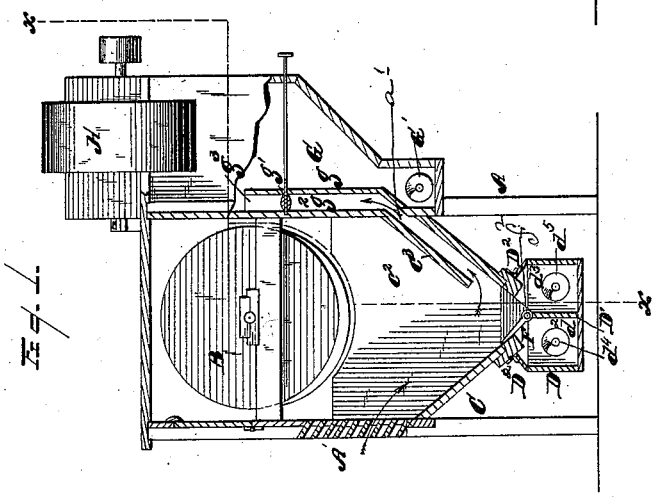
WITNESSES
Samuel E. Thomas
M. B. O'Dogherty
INVENTOR
James P. Deubel
By Wells W. Leggett,
Attorney

United States Patent Office.

JAMES P. DEUBEL, OF YPSILANTI, MICHIGAN.

MIDDLINGS-PURIFIER.

SPECIFICATION forming part of Letters Patent No. 352,810, dated November 16, 1886.

Application filed March 18, 1886. Serial No. 195,716. (No model.)

*To all whom it may concern:*

Be it known that I, JAMES P. DEUBEL, of Ypsilanti, county of Washtenaw, State of Michigan, have invented a new and useful Improvement in Middlings-Purifiers; and I do hereby declare the following to be a full, clear, and exact description of the invention, such as will enable others skilled in the art to which it pertains to make and use it, reference being had to the accompanying drawings, which form a part of this specification.

My invention relates to certain new and useful improvements in middlings-purifiers, which are particularly hereinafter described, and pointed out in the claim.

I carry out my invention as follows: Figure 1 is a transverse vertical section of a machine embodying my invention; Fig. 2, a vertical longitudinal section showing parts in elevation.

A represents any suitable supporting-frame, and B represents a bolt located thereon and provided with a series of graded cloths, $a\ b\ c\ d\ e\ f\ g\ h\ i\ j$.

C represents a series of hoppers or chutes located beneath the screen, said series of hoppers divided into separate apartments, $a'\ b'\ c'\ d'\ e'\ f'\ g'\ h'\ i'\ j'$, by a series of dividing-walls, $c^2$. Said walls extend upward and are concave at their upper edges, as shown in Fig. 1, so as to reach up about the periphery of the reel, to more thoroughly separate the ingredients as they fall from the different grades of cloth and deposit said ingredients in the several apartments of the series of hoppers.

D represents a conveyer-trough, located below said series of hoppers and preferably provided with a dividing-wall, D', this wall separating the trough into two apartments, $d^2$ and $d^3$, each of said apartments provided with any suitable conveyer, $d^4\ d^5$. Said apartments $a'\ b'$, &c., are provided with one or more valves, F F', pivotally supported at their lower ends—as, for instance, upon the top of the dividing-wall D'—so as to be thrown over to either side of said chute, so as to direct the contents of each chute into either apartment of the conveyer-trough, as may be desired. These various hoppers may be provided with a single valve at the base, or more, as may be desired. I prefer to locate at the base of each of said hoppers two valves, so that one may be turned to direct the ingredients in one direction, the other valve to direct the ingredients in the other direction, to correspond with the grading of the cloth upon the screen. These valves may be readily located upon a pivotal rod, $f^2$. The conveyer-trough may also be provided with trap-doors $D^2$, to facilitate access to said valves. The case A is constructed with an opening or series of openings at one side, as shown at A', and said openings provided with a series of slats, as found desirable. The opposite side of the case is also constructed with outlet-drafts for the air, as shown at $a'$.

G represents an air-trunk, which may be located upon the outside of the case A, as shown, or it may be located on the inside of the case, as may be preferred. H represents a fan-blower located in said air-trunk. By this construction it is evident that air will be admitted through the openings $a'$ into the air-trunk. It will be observed that the openings A' and $a'$ communicate with each of said hoppers, so that the current of air can be drawn through each hopper separately. To prevent a too direct draft of air through the hoppers, I prefer to locate in them an inclined wall, $c^3$, projecting downward below the openings $a'$, so as to divert the current of air and check its direct action, as otherwise it might be more liable to draw those ingredients into the air-trunk which should be deposited in the hoppers. I would prefer, also, to locate in the air-trunk a partition-wall, $g$, for the same purpose, the air being obliged to pass up the flue $g^2$, thus formed between the frame of the case and said partition, before it receives the full force of the fan at the top of said division-wall, as shown in Fig. 1.

$g'$ represents a damper or regulating-valve located in the flue $g^2$, formed by the division-wall $g$ and the case, a series of such dampers or regulators being located in said chutes, so that each of said hoppers may have the air-draft regulated therein as may be desired, the flue $g^2$ being provided with a series of partitions, $g^3$, so as to divide off said flue into a series of flues to correspond with said hoppers, each flue being provided with its regulating-damper, as described.

The air-trunk at its base is provided with a conveyer, G'.

The action of the device will now be understood. The ingredients from the graded bolt fall into corresponding hoppers below. The draft is forced through said hoppers from one side of the case along the adjacent periphery of the bolt, to carry with it the ingredients to be separated and carried away through the air-trunk, the draft of air through said hoppers being regulated as desired, and should any of the ingredients pass into the air-trunk and be there deposited the conveyer G' at its base will take care of said deposits, while also the deposits in the several hoppers may discharge therefrom into the conveyer-trough D below, and their discharge be regulated so as to be directed into either apartment of said trough, as may be desired, throughout the series of independent hoppers.

I do not limit myself to the location of the fan at the side of the bolt, as shown in the drawings, or to the production of the draft alone through the case from one side to the other of the bolt alone, as the fan might be located so as to force the air around the reel under and upward over the same, the suction being at the top of the bolt.

What I claim is—

A middlings-purifier comprising a graded bolt or screen, a series of valved hoppers located beneath said bolt or screen, a conveyer-trough beneath said hoppers, an air-trunk having a conveyer in its lower part, and a valved flue connecting each hopper with said air-trunk, the walls of said flue being extended up within the air-trunk, substantially as and for the purpose described.

In testimony whereof I sign this specification in the presence of two witnesses.

JAMES P. DEUBEL.

Witnesses:
N. S. WRIGHT,
M. B. O'DOGHERTY.